United States Patent Office 2,810,710
Patented Oct. 22, 1957

2,810,710

UREA FORMALDEHYDE CONDENSATION PRODUCT

Donald R. Long, Bainbridge, N. Y., assignor to The Borden Company, a corporation of New Jersey No Drawing. Application June 10, 1955, Serial No. 514,761

1 Claim. (Cl. 260—71)

This invention relates to a ureaform condensation product and the process of making it. The invention is particularly useful in making ureaform fertilizer and for that reason will be first illustrated by description in connection with such use.

Ureaform fertilizers, containing condensation products of urea and formaldehyde and also some unreacted urea, have the feature of decreased rate of solubility in soil as compared to urea alone.

The present invention provides a process in which condensation of urea is effected at a pH above the usual in making ureaform fertilizers. The process gives, even at a relatively high temperature of condensation, the desired nitrogen availability. The process produces also minute particles that are substantially alike in composition throughout the entire mass of the ureaform fertilizer and so fine that they may be blended without prior grinding with other fertilizer components, to give a uniform product.

Briefly stated, the invention comprises the herein described process of and product resulting from forming an aqueous solution of formaldehyde and urea in the selected proportions, establishing therewithin a pH within the range about 2.5–4.5, immediately subdividing the solution with pH so established into minute droplets as a mist in air suspension, heating these droplets in spaced relationship to each other and at an elevated temperature, to cause practically instantaneous condensation of the urea and formaldehyde and drying, and then adding to the resulting particles of condensed and dried material an alkali in amount to raise the pH to a level at which subsequent reaction between the urea and formaldehyde is so slow as to be unobjectionable.

The product so made is in the form of generally spherical particles. All of the reactants have been exposed, in preestablished uniform proportions, to substantially the same conditions of pH, temperature and time of heating. The composition of each minute particle, therefore, is substantially the same as for others of the said particles. The overall result is a ureaform fertilizer in the form of particles presenting a maximum of surface area and a minimum of variation in composition and extent of condensation between the individual particles thereof.

The process of the invention is illustrated by spray drying in conventional equipment under the following carefully established conditions.

A solution of urea and formaldehyde in water is first made and mixed till uniform initially, at a pH outside the range at which rapid condensation occurs as, for example, at a pH of 7–9.5. Immediately before spray drying, as in the pipe supplying the urea formaldehyde solution to the spray (usually a wheel rotated at high speed), an acid is introduced in amount to establish the pH within the range 2.5–4.5, suitably 3–4. In the chamber of the spray drier, the sprayed or atomized, and previously acidified solution of the urea and formaldehyde comes into contact with heated air of temperature much above the boiling point of water. There is practically instantaneous evaporation of water from the surface of the droplets, increase of concentration of reactants in the surface portions, and sudden reaction in such portions. The fine droplets, in undergoing these sudden changes, remain predominantly in dispersed relationship to each other, so that any variation in the proportion of urea is restricted to the almost infinitesimal mass of the individual particles and is prevented from affecting the average composition of one particle as compared to other particles of the product. Since the heating is applied to the droplets from the outside and only momentarily, variations in temperature of individual particles is in the direction of higher temperature on the outside or crust of the particles. Some formaldehyde volatilizes into the atmosphere of the drier temporarily; vapor pressure relations promote evenness of its final distribution in the fine particles of condensate produced.

As to materials, any grade of urea is satisfactory. For reasons of economy I use ordinarily the fertilizer or technical grade.

As the aldehyde which is condensed with the urea, I know of no substitute for formaldehyde that is equally satisfactory from the standpoint of both quality of product and economy in use. The formaldehyde may be supplied in any usual form such as the commercial aqueous formalin solution or as paraformaldehyde.

As the acid used to establish the pH of the solution of urea and formaldehyde mixture at the time of spraying or subdividing the solution into the droplets, I use one of the inexpensive mineral acids, examples of which are hydrochloric, sulfuric, and phosphoric.

To neutralize acidity and raise the pH in the finished condensed and dried particles, I introduce an alkali that is unobjectionable in fertilizer compositions. Thus I introduce ammonia, lime, or sodium carbonate, ammonia being the one which is recommended.

As to proportions of materials, the formaldehyde is used in the ratio of about 0.5–1 mole to 1 of the urea.

As to conditions of operations, the original solution of the urea and formaldehyde is made practically saturated with respect to urea so as to decrease the subsequent evaporation required. Thus the original solution may be made and maintained at a temperature of 40°–50° C., pH between 7 and 9, and of concentration at least 40–50 parts of urea by weight to 100 of water.

The temperature before spraying should not be so high as to cause appreciable condensation of the urea and formaldehyde at the pH then prevailing or so low as to cause objectionable precipitation of dimethylol urea.

In the chamber of the spray drier, the air inlet temperature is high, suitably 175°–325° C.

The rate of passage of the heated air and also the introduction of the spray-dried material into the drying chamber is such that the outflow air temperature is above 90° C., as 110°–125° C. I consider the time of the heating and drying of the droplets of urea and formaldehyde solution and effecting the condensation of urea and formaldehyde therein in the chamber to be less than 2 minutes and normally 15–40 seconds. The ureaform fertilizer particles issue from the drier at about 90° to 130° C.

This product issuing from the bottom of the spray-drying chamber is collected on a conveyor where the ammonia or other alkali may be added in any conventional manner, as by spraying a solution on the material on the conveyor.

The equipment used is not illustrated since it is conventional in other arts.

In a representative run, the product issuing directly from the spray drier showed a pH of 3.2 when tested in a slurry of 3 parts by weight of the material in 97 of water. A solution of commercial ammonia water was sprayed lightly upon this product, to raise the pH to 7.

The mean size of particles of my spray-dried product varies somewhat with conditions but is always small, as approximately 5–100 microns. The spheres in predominating proportion are hollow.

The analyses for total nitrogen and determination of other properties of the dried product from two representative runs, before the addition of alkali after the drying and condensation, are shown in the following table:

|  | Run 1, Percent | Run 2, Percent |
|---|---|---|
| Total nitrogen | 38.8 | 38.1 |
| Nitrogen insoluble in hot phosphate buffer solution | 9.7 | 11.2 |
| Nitrogen insoluble in cold water | 21.5 | 24.3 |
| Nitrogen soluble in cold water, percent of total N | 44.6 | 36.2 |
| Nitrogen soluble in hot buffer solution, percent of total N | 75.0 | 70.6 |
| Loss on drying at 105° C., 3 hrs | 1.4 | 1.7 |
| Availability index [1] | 54.9 | 53.9 |
| pH of a 3 percent slurry | 3.2 | 3.5 |

[1] The availability index is based upon the percentage of the cold water insoluble nitrogen that dissolves in a hot aqueous phosphate buffer solution. Values obtained are an index of the agronomic availability of the cold water insoluble nitrogen. The availability index (AI) approximates the amount of insoluble nitrogen that nitrifies in about 6 months in an average soil, as defined by and determined by Kralovec and Morgan, Agri and Food Chem., 2, 93 (1954). The availability index=100 [percent cold water insoluble nitrogen—percent hot buffer (0.063 M $KH_2PO_4$) soluble nitrogen] divided by percent cold water insoluble nitrogen.

The invention will be further illustrated by description in connection with the following specific example of the practice of it. In this example and elsewhere herein proportions are expressed as parts by weight unless otherwise specifically stated to the contrary.

Example

Aqueous formaldehyde solution, a usual buffer to control the acidity of the formaldehyde at a pH within the range 7–9.5, and urea are mixed and dissolved, to give a uniform aqueous solution.

The proportions were:

|  | Pounds |
|---|---|
| 44% formaldehyde solution (5.25 moles) | 357.5 |
| Trisodium phosphate | 0.8 |
| Urea (6.56 moles) | 392.5 |

The whole was warmed to promote solution of the urea and maintained at about 40° C. The pH was 8.0, the phosphate successfully buffering the acidity of the formaldehyde which, as used, ran 0.06% of acid calculated as formic.

The solution was then fed to a spray drier by a small gear pump, as at the rate of 2 gals. per minute to a spray wheel 8" in diameter revolving at 14,400 R. P. M. As the solution was being delivered to this spray wheel, acid was introduced into the feed pipe leading to the wheel, so that the solution was subdivided into a mist of fine droplets immediately after the acidification to conditions for the rapid condensation of urea and formaldehyde. In this case I introduced dilute sulfuric acid into the pipe in amount to establish a pH of 3–4. (This pH is determined to advantage by sampling the finished dried product and reslurrying it in order to give material for the pH test. After some experience, the proportion of sulfuric acid required is easily estimated and the results of its incorporation need be checked only at intervals.)

The inlet air temperature to the spray drier vessel was 230° C. and the outlet temperature 110° C. In this heated supply of air the individual fine droplets of the subdivided acidified solution are suspended in spaced relationship to each other.

Because of voltailization of some of the formaldehyde, it is desirable to pass the exit gases from the spray drying chamber to means for recovery of formaldehyde, as, for example, to an activated charcoal adsorber therefor.

The dried particles of urea formaldehyde condensate were delivered from the bottom of the spray drying chamber to a conveyor. Here ammonium hydroxide solution was sprayed upon the material in amount to neutralize the sulfuric acid previously added.

All of the equipment used was conventional.

It will be understood that it is intended to cover all changes and modifications of the examples of the invention herein chosen for the purpose of illustration which do not constitute departures from the spirit and scope of the invention.

What is claimed is:

In making a ureaform fertilizer, the process comprising making an aqueous solution of urea and formaldehyde in the proportion of about 0.5–1 mole of formaldehyde to 1 of urea and at a pH of approximately 7–9.5, then adding acid in amount to establish the pH within the range 2.5–4.5 and immediately subdividing the acidified solution into fine droplets suspended in a heated stream of air of temperature substantially above the boiling point of water, so as to cause rapid condensation of urea and formaldehyde and drying of the droplets, and mixing into the dried product an alkali in proportion to neutralize the said acid.

References Cited in the file of this patent

UNITED STATES PATENTS

| 2,415,705 | Rohner et al. | Feb. 11, 1947 |
| 2,618,546 | Davenport | Nov. 18, 1952 |